Figure 1:
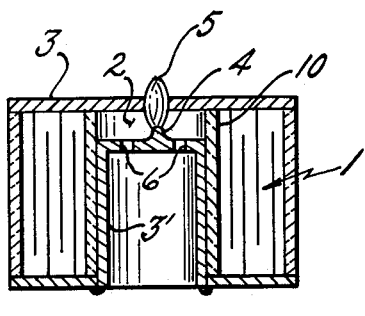

Feb. 20, 1962 H. FISCHER 3,022,444
ULTRA SHORT LIGHT PULSE GENERATION
Original Filed March 28, 1958 4 Sheets-Sheet 1

INVENTOR.
HEINZ FISCHER
BY
ATTORNEYS

INVENTOR.
HEINZ FISCHER

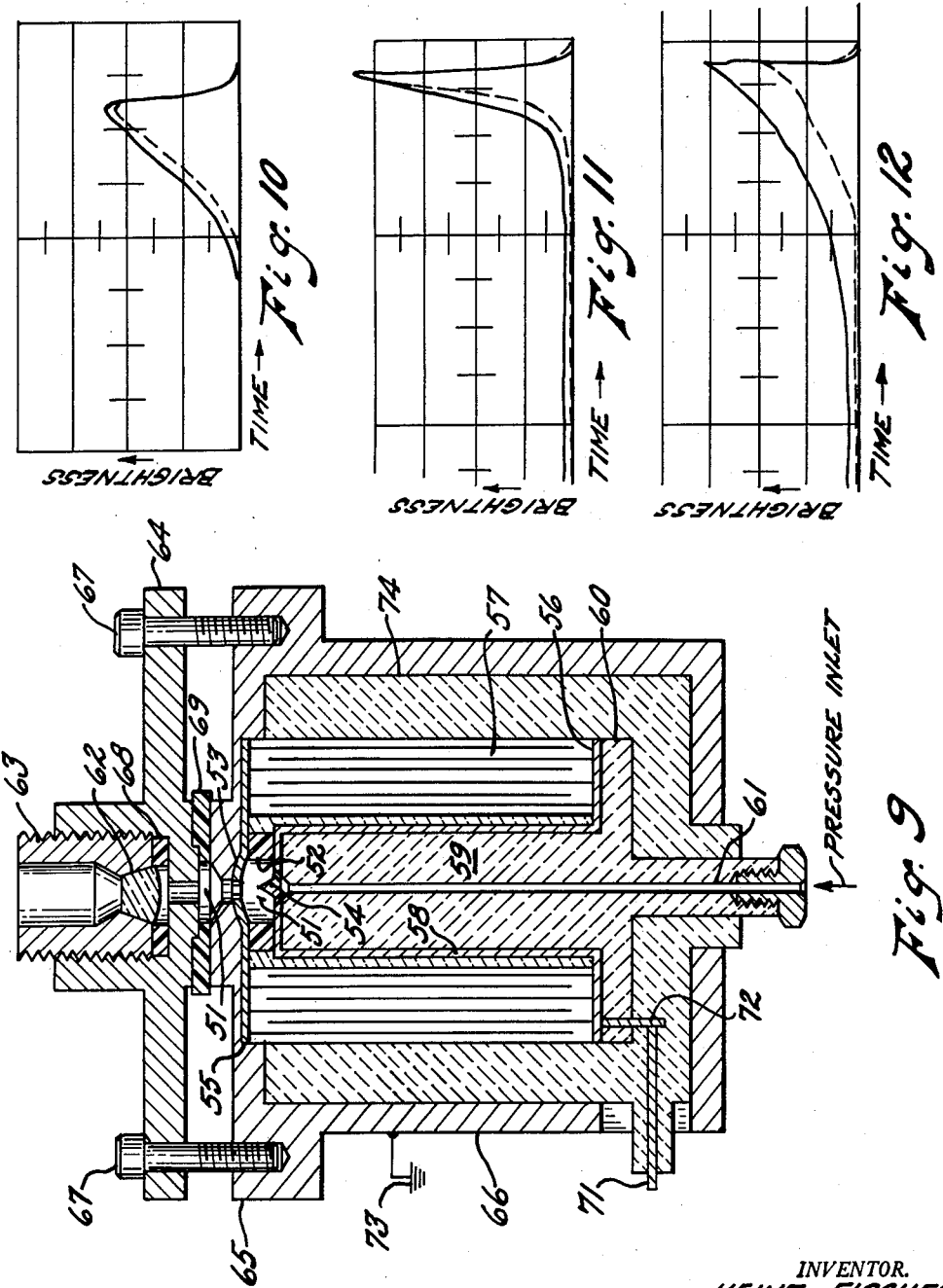

Feb. 20, 1962 H. FISCHER 3,022,444
ULTRA SHORT LIGHT PULSE GENERATION
Original Filed March 28, 1958 4 Sheets-Sheet 4

INVENTOR.
HEINZ FISCHER
BY
ATTORNEYS

United States Patent Office 3,022,444
Patented Feb. 20, 1962

3,022,444
ULTRA SHORT LIGHT PULSE GENERATION
Heinz Fischer, Belmont, Mass.
Original application Mar. 28, 1958, Ser. No. 724,776, now Patent No. 2,911,567, dated Nov. 3, 1959. Divided and this application Oct. 27, 1959, Ser. No. 849,125
8 Claims. (Cl. 315—61)
(Granted under Title 35, U.S. Code (1952), sec. 266)

The invention described herein may be manufactured and used by or for the United States Government for governmental purposes without payment to me of any royalty thereon.

This invention relates to light generation, and particularly to the generation of light pulses of extraordinary brilliance and having a duration limited to a small fraction of a microsecond. This application is a division of my application No. 724,776 filed March 28, 1958, of identical title, now Patent No. 2,911,567.

In my Patent No. 2,728,877, granted December 27, 1955, there is described a method and apparatus for generating heat pulses of high intensity, suitable for many purposes including, as examples, infra-red signalling, nuclear reaction triggering, material melting, and metal vaporization. As summarized in the specification of the patent, the method comprises building up a direct current charge on a capacitor assembly of toroidal contour, and discharging the capacitor across a pressurized gas gap at the axis of the toroid, the gap being in the center of a chamber whose walls are opaque except for a small insert of lithium fluoride or some equivalently good conductor of optical radiation. The capacitor and associated circuitry are such as to minimize inductance and resistance effects and thus reduce the discharging time by eliminating practically all current flow delaying factors.

While the objective discussed at greatest length in the aforesaid patent is the rapid production of an extremely high temperature, the fact is that the production of intensely brilliant light pulses of ultra-short duration is also inherent in the operation, and references to this fact are set out in the patent specification. The present invention involves the provision of three additional methods of producing ultra-short light pulses of extreme brilliance, which methods may be distinguished, each from the others by these designations, namely:

(1) The open air gap method;
(2) The low-pressure method; and
(3) The high-pressure method.

The present invention further involves the provision of apparatus capable of putting into practice the concepts of light-pulse generation falling into the three categories indicated.

Figure 6:
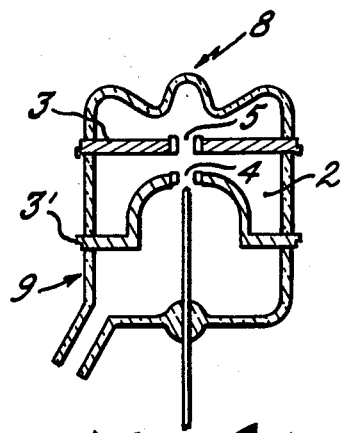
Figure 7:
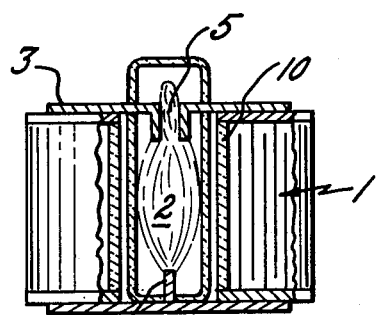
Figure 8:
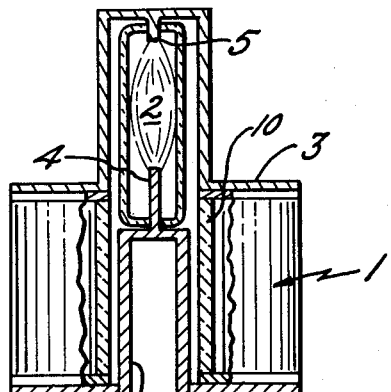

Other objects and acharacteristics of the invention will become apparent upon reference to the following description of the invention and the accompanying drawings wherein:

FIGS. 1 to 5, and FIG. 13, are views, partly sectional and partly schematic, illustrating structures for putting into practice the "open air gap" concept above referred to;

FIGS. 6, 7, and 8 are views illustrating structures for putting into practice the "low pressure" concept above referred to;

FIG. 9 is a longitudinal sectional view of a structure for putting into practice the "high-pressure" concept above referred to; and FIGS. 10 11, and 12 are pulse time diagrams hereinafter explained.

By way of introduction to the following description it may be noted that commercial "flash-lamps" utilizing capacitor circuitry obtain light pulses of approximately 1 microsecond or longer. Their peak brightness in absolute values of brightness, i.e., candles per cm.$^2$, are normally not reported, but have been measured by applicant recently and found to be in the order of approximately 5 million candles/cm.$^2$.

Experimental studies have proved that it is the length of the electrical pulse of such flash lamp which in the first approximation determines the length of the light pulse, and it was observed by applicant that the brightness maximum correlates closely in time with the current maximum even in case of capacitor discharges as short as $5-10^{-8}$ seconds. It also was found that the amplitude of the light pulse (brightness) is determined to a large extent by the discharge current.

In case of a capacitor discharge in which the resistance in the spark gap is not kept up by a "squeeze" of the spark channel, the resistance of the gap during the time of the discharge becomes extremely small, which results in an oscillating discharge. Here the maximum current in first approximation is expressed by the following equation:

(1) $\qquad i_{max} \sim U(C/L)^{1/2}$ [amps.]

the pulse length on the other hand is (2) $\qquad \tau \sim 2(LC)^{1/2}$ [sec.]

So, it is obvious from (1) and (2) that at a given break down voltage U the ratio C/L must be made as larg as possible in order to get a current $i_{max}$ as large as possi ble (i.e., maximum brightness) at a minimum puls length $\tau$.

The ideal case, in respect to current pulse shape an. energy transfer from the capacitor into the gap, is me when the inductance L can be decreased to a value (3) $\qquad L=4R^2C$ [henries]

because here the discharge is critically damped and th energy transfer into the channel being maximum, whicl is ½ of the total capacitor energy.

(4) $\qquad K=CU^2/2$ [joules]

So far, the critically damped case could not be materialized in a high current capacitor discharge without "squeezing" the channel through a tube or aperture. Actually, the spark resistance $R_s$ (decreasing with the current) may become of the order of less than $10^{-3}$ ohms representing only a small fraction of the total resistance R. In this case, most of the energy is used up in the outer circuit. Consequently, reduction of the resistance $R_c$ of the outer circuit to a minimum is of importance.

The oscillating spark current leads to humps and a tail in the decaying part of the light pulse and in most applications it is required that this tail is kept to a minimum; this latter is accomplished to some extent by an additional quenching gap.

The spark resistance can be maintained to some extent by forcing the discharge through a narrow capillary or other aperture, which stops the channel's expansion. The problem is to "squeeze" the channel to just the right degree so that the circuit is critically damped, which is when (3a) $\qquad R_s = 2(L/C)^{1/2}$ The proper diameter to enforce this condition depends upon discharge parameters such as gas pressure, current, etc., and is a delicate problem to determine. The expansion forces, on the other hand, especially at large gas pressure may become so large that a practical solution of the squeeze problem becomes difficult.

FIG. 1 represents the diagram of a simple air lamp. It consists of a coaxial capacitor 1 which surrounds the discharge 2, as indicated. Thus, the capacitor, the air gap and the electric connections 3 to the gap form together a symmetrical coaxial line reducing the inductance L of the complete circuit to a minimum. The discharge takes place between the pointed electrode 4 and the center hole 5 in the top plate, producing a bright spark channel between the electrodes which may extend into a radiating "bubble" as indicated in FIG. 1. The size and brightness of this bubble depends largely upon parameters such as of the nature of gas, pressure, capacity C, breakdown voltage U, hole diameter $d$, as well as thickness of the top plate. The bubble extends out of the hole as much as ½ cm. and more. Change in polarity of the electrodes 4, 5 does not seem to greatly influence the visual appearance of the bubble, however, the amplitude (brightness) of individual shots was found to be more reproducible in case of a negative top plate (cathode). The inside connection to the pointed electrode provides several exhaust holes 6, as indicated.

Figure 2:
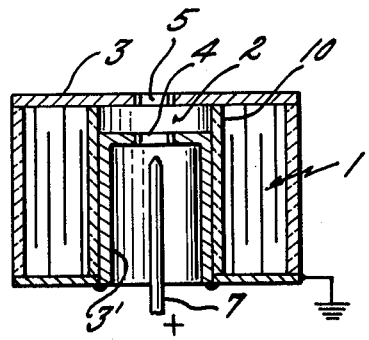

A triggered coaxial air gap is shown in FIG. 2. It applies the same general geometry, however, provides a trigger 7. The pointed electrode in FIG. 1 is now replaced in FIG. 2 by an electrode having a hole 4 through which the discharge between electrodes 4 and 5 may be triggered. This hole in electrode 4 is important since it permits short wave radiation from the trigger discharge to enter into the prospective path of the main discharge in chamber 2 which is to be triggered. This radiation from the trigger discharge has been found to cut down formative time lags (jitter) in the firing of the main discharge. The trigger pulse at electrode 7 may be positive or negative.

The end-on geometry, as applied in FIGS. 1 and 2, provides basically a point light source, the radiation of which originates from the "bubble" formed in the hole of the top electrode. Added to this radiation is the radiation from the spark channel which is seen end-on through the center hole in case of a transparent bubble. Results obtained with the open air gap method, as recorded below in Table 1, indicate that the bubble apparently contributes largely to the radiation. The radiation pulse trails off with the current, which generally oscillates in the case of an unrestricted spark channel, as above pointed out.

When spectrally resolved, the radiation pulse showed strong differences in its decay time. It was found that certain spectral lines decay much slower than the rest of the visible and UV spectrum. This phenomenon is further discussed hereinafter.

*Quantitative results.*—The subjoined "Table 1" gives figures on brightness B and pulse lengths ($\Delta t_1$=half width; $\Delta t_2$=base width) as actually obtained with several test lamps of the type shown in FIG. 1.

Table 1.—Brightness B and pulse length $\Delta t$—FIG. 1 type of lamp

| No. | Gap, cm. | Hole, cm. | U, kv. | C, µf. | L, µh. | $\tau$, µsec. | C/L | $i_{max}$, kamp. | B, $10^6$ cand./cm.$^2$ | $\Delta t_1$, µsec. | $\Delta t_2$, µsec.×$10^{-3}$ | R, ohms | K, joules |
|---|---|---|---|---|---|---|---|---|---|---|---|---|---|
| 1 | .07 | 0.1 | 3.17 | 0.1 | 0.004 | 0.127 | 25 | 15.7 | 20.2 | | | 36 | 0.5 |
| 2 | .08 | 0.1 | 3.33 | 0.1 | 0.004 | 0.127 | 25 | 16.6 | 18.7 | 0.2 | 0.37 | 43 | 0.55 |
| 3 | .08 | | 3.5 | 0.1 | 0.004 | 0.125 | 25 | 17.5 | 23.2 | 0.25 | 0.6 | 35 | 0.55 |
| 4 | .08 | 0.1 | 3.33 | 0.05 | 0.004 | 0.091 | 12.5 | 11.8 | 11.9~ | 0.22 | 0.54 | 40 | 0.275 |
| 5 | .07 | 0.1 | 3.17 | 0.025 | 0.004 | 0.063 | 6.25 | 7.9 | 5.5~ | 0.01 | 0.38 | 50 | 0.124 |
| 6 | .07 | | 3.1 | 2.8 | 0.035~ | 1.95 | 80 | 27.8 | 42 | | | | 13.4 |

*Inductances.*—The toroidal capacitors used in the tested lamps were of the extended foil type indicated in FIG. 1. These values of L, however, do not represent optimum values for this type of capacitor. In case of test specimens Nos. 4, 5 in Table 1, the capacitors were over-dimensioned; actual L values can be made smaller, at least by a factor 2 to 4, without any change in material or design. Substantial reduction of L under that of the extended foil-type can be achieved by substituting a long ribbon type coaxial capacitor. In such an arrangement the capacitor foils need not be cross-connected at top and bottom; one end may be left open and the other end fed directly into a coaxial line, which is connected to the spark gap in the manner indicated in FIGS. 1 and 2. Inductances of $L<10^{-9}$ henries may be safely expected from this type of capacitor.

*Brightness.*—The B values already obtained with the coaxial open air gap are considerably larger than those of the customary commercial flash lamps as demonstrated in Table 1. With the tested lamps, the brightness goes roughly with the current $i_{max}$, as was discussed in the introduction, proving that L and C/L factor determine B to a large extent. The significance of extremely good contact is demonstrated in the data of lamp No. 2 in Table 1, where B is reduced due to increased resistance $R_c$ in the outer circuit, in spite of C and L being equal to No. 1; the pulse width on the other hand is reduced substantially by the increased damping.

On the basis of these results, approximate B values for the invented light source may be predicted from known electric data, U, C, L, which may be calculated. The calculation of L, however, becomes difficult when considering extreme small values $L<10^{-9}$ henries and consequently short electric pulses. Here the spark gap itself may represent a considerable part of the total inductance.

With increasing spark current, the brightness approaches a limiting value which in the open air gap was found to be between 40–50 million candles/cm.$^2$ (see also lamp 6 in Table 1). When this value is reached, the radiation pulse (brightness as a function of time) becomes wider. This widening shows up much more pronounced in the total magnetic flux time function. It may even lead to a considerable increase of the magnetic flux amplitude after the current has reached its maximum.

*Pulse length.*—Applying geometry of FIG. 1, the experimental length of the radiation pulse, according to Table 1, is roughly $\Delta t_1 \sim 2\tau$ for the half width and approximately $\Delta t_2 \sim 6\tau$ for the base width including the tail which results from the current oscillations—$\Delta t_2$ is difficult to analyze since the "bubble" and spark channel may have different decay times. In case of a transparent bubble, the tail of the radiation time function as emitted through the hole may even be cut off to a large extent by its aperture, as is discussed in a later paragraph. Since the opacity of the bubble is expected to decrease with the spark current, this may mean that pulse widths $\Delta t_2 < 6\tau$ may be expected in case of extremely small $\tau < 0.1$ micro-second because C/L (see introduction) and consequently $i_{max}$ will have to be sacrificed in order to obtain extremely small values of $\tau$.

Figure 5:
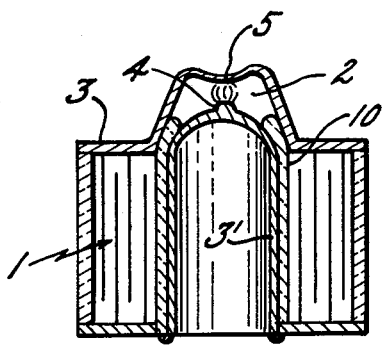

*Predicted values.*—Based on the discussion of the preceding paragraph, the following values of B and pulse length $\Delta t$ are considered possible:

coaxial capacitor by means of an open cage allowing complete axial side view of the channel, as illustrated in FIG. 5. Such a lateral display of the lift pulses may be advantageous for certain purposes.

SEALED COAXIAL LOW-PRESSURE LAMP (1) The geometry which was discussed in the preceding paragraphs for the open air gap may be applied for the sealed low-pressure lamp. FIG. 6 shows the design of such a lamp as built and tested successfully to a moderate extent. This lamp does not suggest maximum pulse power because of the danger of window blackening. Definitive advantage however lies at small pressure in the

*Table 2.—Predicted values of B and $\Delta t$*

| Capacitor | U | C | K | L | C/L | $\tau$ | $i_{max}$ | $R_{ap}$ | B | $\Delta t_1$ | $\Delta t_2$ |
|---|---|---|---|---|---|---|---|---|---|---|---|
| Extended foil | 4 | 0.2 | 1.6 | .004 | 50.0 | .178 | 28.2 | .283~ | 40 | .356 | 1.068 |
|  | 4 | 0.05 | .4 | .002 | 25.0 | .063 | 20.0 | .40 ~ | 25 | .12 | .376 |
|  | 4 | 0.02 | .16 | .001 | 10.0 | .028 | 12.6 | .634~ | 18 | .056 | .168 |
| Long ribbon | 4 | 0.2 | 1.6 | .001 | 200.0 | .089 | 56.5 | .141~ | 40–50 | .18 | .534 |
|  | 4 | .05 | .4 | .0005 | 100.0 | .031 | 40 | .20 ~ | 40 | .06 | .186 |
|  | 4 | .02 | .16 | .0005 | 40.0 | .020 | 25.4 | .316~ | 30 | .04 | .120 |
| Type | Kv. | µf. | joules | µh |  | µsec. | Kamp. | Ohms | 10⁶ candles/cm.² | µsec. | µsec. |

These values of Table 2 are to be considered rough estimations. Of special interest appears the application of the long ribbon type capacitor, since it possibly allows a critical damped discharge (see low values of $R_{ap}$ in Table 2).

The amplitude (brightness) of individual shots as observed from end-on (see FIGS. 1 and 2) is connected with statistic changes largely due to the fact that the discharge does not fire each time from the same spot of the pointed electrode into the same spot of the hole. Improvement in the reproducibility is obtained by radioactive material used in electrode tips 4, 7, and walls of the hole electrode.

Figure 3:
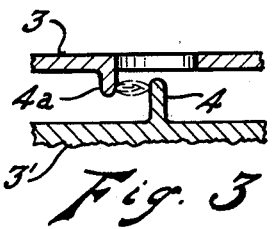
Figure 3A:
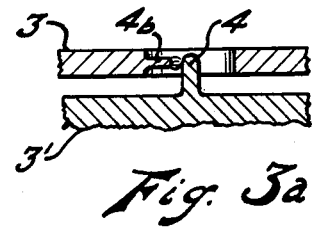

Most successful in accomplishing reproducible amplitudes of single shots has proven an arrangement as sketched in FIG. 3, however, leads to a slightly wider light pulse (see Table 1). Here the discharge fires from electrode 4 to another tip which is extended into the gap from the top plate, as indicated in FIG. 3. The hole is set off center. Seen through the hole, the channel now lies across. The discharge does not fire any more axially into the hole, eliminating the bubble to a large extent. This means the channel is seen perpendicularly across which accounts for the longer radiation pulse, as illustrated in the graph, FIG. 10; L and $\tau$ are practically unchanged due to the unchanged overall geometry. FIG. 3a shows a variation of the same concept.

The trace depicted in FIG. 10 consists of 10 shots, demonstrating that the amplitudes are constant within approximately ±5%. The FIG. 10 time base is 0.2 µsec./div.

Figure 4:
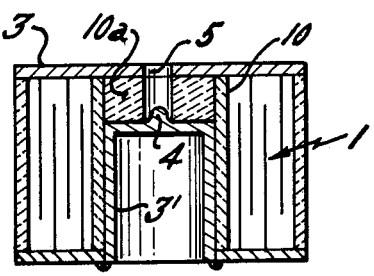
Figure 13:
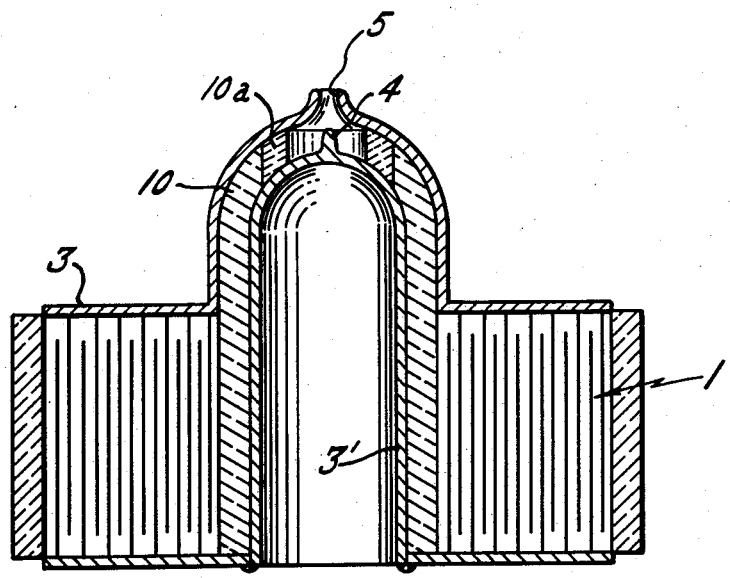

Squeeze of the channel by means of an inserted capillary 10a made of insulating material such as quartz, fired lava, etc., is shown in FIG. 4. FIG. 13 shows another form of "squeezed" channel.

This arrangement not only allows increase in the spark resistance, $R_s$ preferably to the critical value, see Formula 3a, but also keeps the channel lined up in the axis of the center hole leading to a constant amplitude of individual shots.

*Open cage.*—The coaxial pulse light source discussed so far is not restricted to end-on observation (see FIGS. 1 and 2). The open air gap may be extended out of the lower breakdown voltages, longer spark channel, easier squeeze and higher repetition rates. The lamp may apply any inert gases.

The container 9 in FIG. 6 consists of glass, quartz glass or other insulating material. The electrodes 2 are made of cover with inserted tungsten pieces 3 for the electrodes. The "bubble" window 8 due to its extremely small thickness had adequate UV and infrared transmission, allowing the lamp to be used for visual as well as for UV and infrared source. Undesired radiation may be filtered out by spectral filters.

The pressure in the tube can be chosen anywhere around one atmosphere or under, depending upon the application in this specific case and the nature of gas. Generally, a gas pressure in the range from 100–400 mm. Hg may be considered practical.

(2) Simple sealed lamps with a squeezed channel are illustrated in FIGS. 7 and 8.

DEMOUNTABLE HIGH-PRESSURE LAMP (1) Different designs of coaxial high pressure lamps have been built and successfully tested. They follow the geometry of the lamps described above. They include the end-on type as well as the open cage side view type (see FIGS. 1, 2, 6).

(2) *Maximum brightness.*—It has been found by applicant that for a given capacitor and gap length, the visual brightness B increases strongly with the gas pressure $p$ to an ultimate upper limit $R_{max}$ which is determined mainly by the nature of the gas; $B_{max}$ can be increased to some extent by improved efficiency factor C/L. Opacity measurements showed that this ultimate brightness is obtained shortly after the spark channel reaches opacity. So far, the largest values $B_{max}$ were obtained in helium, amounting to approximately 150 million candles/cm.². Apparently this is due to the fact that helium reaches opacity at considerably larger values of $p$ and current than other gases. Helium, on the other hand, due to its larger transparency at lower pulse energy, is by no means the most efficient radiator. Argon, for example, has much larger brightness at relatively small energies. Table 3 gives comparison values of brightness for different gases in different type of apparatus.

*Table 3.—Comparison of values of brightness obtained in different apparatus*

| No. | Gap, cm. | Gas | $P_t$, lbs. | U, kv. | C, µf. | L, µh. | τ, µsec. | C/L | $i_{max}$ kamp. | B, million cand./cm.² | R, milliohms | X, joules |
|---|---|---|---|---|---|---|---|---|---|---|---|---|
| 1 | 0.2 | Ar | 25 | 4.5 | 0.57 | .15 | 1.95 | 3.8 | 8.8 | 11.5 | 12.0 | 5.8 |
| 2 | 0.2 | Ar | 100 | 8.5 | 0.57 | .15 | 1.95 | 3.8 | 16.6 | ¹ 23.0 | 7.0 | 20.5 |
| 3 | 0.2 | He | 200 | 4.75 | 0.57 | .15 | 1.95 | 3.8 | 9.3 | 6.0 | 12.0 | 6.4 |
| 4 | 0.2 | He | 1,500 | 16.0 | 0.57 | .15 | 1.95 | 3.8 | 31.2 | ¹ 60.0 | 4.0 | 73.1 |
| 5 | 0.2 | Ar | 20 | 3.15 | 2.75 | .033 | 1.95 | 82.5 | 28.6 | 72.5 | >2 | 13.0 |
| 6 | 0.2 | Ar | 40 | 4.0 | 2.75 | .033 | 1.95 | 82.5 | 36.2 | ¹ 98 | >2 | 20.8 |
| 7 | 0.2 | He | 100 | 2.66 | 2.75 | .033 | 1.95 | 82.5 | 24.2 | 3.9 | >2 | 9.7 |
| 8 | 0.2 | He | 200 | 4.15 | 2.75 | .033 | 1.95 | 82.5 | 37.7 | 8.1 | >2 | 23.6 |
| 9 | 0.2 | He | 400 | 6.8 | 2.75 | .033 | 1.95 | 82.5 | 61.8 | ¹ 170 | >2 | 63.5 |
| 10 | 0.2 | Ar | 50 | 2.5 | 5.5 | .016 | 1.90 | 350 | 46.7 | 23 | | 17.2 |
| 11 | 0.2 | He | 100 | 2.5 | 5.5 | .016 | 1.90 | 350 | 46.7 | 45 | | 17.2 |

10, 11 and on through hole, all others side view.
¹ Ultimate brightness.

If this explanation is true, there is promise that higher ultimate values $B_{max}$ may be obtained in hydrogen which is more transparent than helium.

(3) *Medium energy.*—A compact and easily demountable test lamp for pressures between approximately 1–20 atmospheres and breakdown voltages under approximately 10 kv. is shown in FIG. 9. This lamp, which has been extensively and successfully tested in helium, and argon, is mounted in a container which encloses both the capacitor and the gap; however, only the spark chamber is pressurized.

The spark chamber 51 is bounded peripherally by a sealing gland 52 of deformable insulating material, and is bounded laterally by electrodes 53 and 54, the former being the centrally perforated portion of capacitor terminal plate 55, and the latter being the grid-like central section of the other capacitor terminal plate 56, which plates 55, 56 enclose and complete the capacitor assembly 57. The central section 54 of plate 56 connects with the base portion by way of cylindrical section 58 fitting around the supporting spool 59 of insulating material. In fact, parts 56 and 58 may be metal-plated on spool 59 and its flange 60, with the perforated central grid 54 bonded thereto. Spool 59 is centrally bored to form a passage 61 for admission of gas under pressure to chamber 51 by way of the perforations in grid 54. A quartz window 62 is inserted in a gland element 63 threadedly engaging pressure plate 64, which in turn is adjustably mounted on flange 65 of housing 66 by means of screws 67. Teflon seals 68 and 69 are compressed by the pressure, applied through adjusting elements 63 and 64, respectively, to effectively seal the chamber 51. Current is supplied to capacitor terminal plate 56 by leads 71 and 72, the former connecting to a source, not shown. The circuit is completed to ground 73 by way of terminal plate 55 and housing 66. A second insulator 74 surround capacitor 57 and spool 59.

The FIG. 9 construction can be built in extremely small sizes and favorable C/L ration. Brightness values of approximately 20 million candles were observed in end-on position in argon, and relatively easy may be pushed to the maximum value $B_{max}$ of approximately 40 to 50 millions with increased p, U and C/L as discussed in the preceding paragraph. So far the design of this particular lamp was limited to C<0.25 µf. and C/L 25, which is comparable to the electrical data of the open air gap as described in Table 1.

Radiation time functions investigated in the gases $H_2$ and helium revealed that the decay time of the pulse differs strongly in different spectral regions. FIG. 11 and FIG. 12 show radiation time functions in helium at two different spectral ranges. The electrical data were C=0.1 µf., L~.01 µh., τ~.25 µsec., U~2 kv., the wave lengths 4685 A. and 5875 A.

It has been found that the radiation pulse in FIG. 11 is considerably shorter than the current pulse, the latter being oscillating. This latter effect may be explained by the assumption that the spark channel has a dark core in this particular spectral range. Thus the expansion of the channel as a function of time would move the radiating shell out of the angle of view as defined by the center hole in the top electrode. This results in this sharp triangular light pulse with cut-off tail. The time base in FIG. 11 is 0.5 microsecond per division, which makes the halfwidth of the radiation approximately 0.25 ms. and the base width 0.5 ms. This in relation to the pulse length τ is much shorter than that of the open air gap in Table 1.

The rather ragged and much slower decay in FIG. 12 indicates that radiation of this particular spectral range (5875 A.) must be filling up the otherwise dark core of the channel. This radiation, of course, could also come from the bubble. A very high modulation frequency of this radiation, amounting to roughly 10 megacycles, is indicated. This phenomenon may be related to a magnetic hydrodynamic oscillation within either the interior of the channel or the "bubble" in the center hole.

It is important, in order to achieve high temperatures (as well as high "bubble" efficiency), that the channel defining the spark gap be as small as possible, so that the energy discharge can occur without substantial dissipation in too short a time period. Moreover, to achieve even greater channel diminution, it is desirable to "squeeze" the channel, either physically, magnetically, or by a combination of both these methods. In the arrangements illustrated, magnetic restriction is substantial, due to the heavy concentration of magentic flux immediately adjacent to the periphery of the spark-gap channel. This heavy concentration has the effect of raising the electrical resistance of the channel, thereby reducing current oscillating tendencies, wtih a corresponding increase in the efficiency of energy transfer, as is also explained in my co-pending patent application No. 724,774, filed March 28, 1958. In this manner both the discharge spark and the "bubble" can be restricted and controlled by regulation of the magentic field.

What is claimed is:

1. The method of generating light pulses of extreme brilliance and ultra-short duration which comprises the steps of winding electrically conductive and non-conductive materials in inter-leaving relationship about a central axis, in spaced relation to said axis to form a toroidal capacitor assembly surrounding a central space of cylindrical contour, extending the terminals of said capacitor assembly across said cylindrical space to form a chamber whose outer bounding wall is entirely opaque except for a central aperture embracing the central axis, and storing an electric current charge in said capacitor assembly, for subsequent discharge across the extended capacitor terminals.

2. The method of generating light pulses of extreme brilliance and ultra-short duration which comprises the steps of winding electrically conductive and non-conductive materials in inter-leaving relationship about a central axis, in spaced relation to said axis to form a toroidal capacitor assembly surrounding a central space of cylindrical contour, extending the terminals of said capacitor assembly across said cylindrical space to form a chamber whose outer bounding wall is entirely opaque except for a central aperture embracing the central axis, and storing an electric current charge in said capacitor assembly, for subsequent discharge across the extended capacitor terminals, in the projected area of said aperture, whose outer bounding wall is directed axially beyond said space, and laterally apertured, and storing an electric charge in said capacitor assembly, for subsequent discharge across the extended capacitor terminals.

3. The method of generating light pulses of extreme brilliance and ultra-short duration which comprises the steps of winding electrically conductive and non-conductive materials in inter-leaving relationship about a central transmission line which consists of two separate layers of metallic conductive material separated by at least one layer of insulating material arranged in such a way allowing to transmit the electric charge from said inter-leaving layers directly into said transmission line.

4. The method defined in claim 3, including the further step of extending said transmission line beyond said inter-leaving layers.

5. Means for generating light pulses of extreme brilliance and ultra-short duration comprising strips of electrically conductive and non-conductive materials wound in inter-leaving relationship about a central axis, in spaced relation to said axis, to form a toroidal capacitor assembly surrounding a central space of cylindrical contour, said toroidal capacitor assembly having terminals extending across said cylindrical space to form, at one end of said cylindrical space, a chamber whose outer bounding wall is entirely opaque except for a central aperture embracing the central axis, and means for causing electrical energy stored in said capacitor assembly to traverse said extended capacitor terminals and discharge across said chamber.

6. Means for generating light pulses of extreme brilliance and ultra-short duration comprising strips of electrically conductive and non-conductive materials wound in inter-leaving relationship about a central axis, in spaced relation to said axis, to form a toroidal capacitor assembly surrounding a central space of cylindrical contour, said assembly having terminals extending axially beyond said central space to form a chamber having a lateral aperture, and means for causing electrical energy stored in said capacitor assembly to traverse said extended capacitor terminals and discharge across said chamber.

7. Apparatus as defined in claim 6, including an insulated passageway for feeding pressurized gases to said aperture chamber.

8. A capacitor assembly comprising strips of electrically conductive and non-conductive materials wound in inter-leaving relationship about a central axis to form a toroidal capacitor enclosing a central space of cylindrical contour, a set of electrodes in alignment with said central axis, means surrounding said electrodes to define a spark channel, and means for energizing said electrically conductive strips in a manner to cause restriction and stabilization of said spark channel by the action of the magnetic field generated by the storage of current in said capacitor assembly.

References Cited in the file of this patent

UNITED STATES PATENTS

| | | |
|---|---|---|
| 2,602,910 | Stuart | July 8, 1952 |
| 2,663,792 | Gretener | Dec. 22, 1953 |
| 2,668,260 | Barnett | Feb. 2, 1954 |
| 2,728,877 | Fischer | Dec. 27, 1955 |
| 2,900,566 | Fischer | Aug. 18, 1959 |